United States Patent
Kuo

(10) Patent No.: US 9,100,930 B2
(45) Date of Patent: Aug. 4, 2015

(54) METHOD OF SELECTING OPERATING FREQUENCY FOR USER EQUIPMENT IN A WIRELESS COMMUNICATIONS SYSTEM AND RELATED APPARATUS

(75) Inventor: Richard Lee-Chee Kuo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 891 days.

(21) Appl. No.: 11/898,562

(22) Filed: Sep. 13, 2007

(65) Prior Publication Data

US 2008/0070584 A1 Mar. 20, 2008

Related U.S. Application Data

(60) Provisional application No. 60/844,387, filed on Sep. 14, 2006.

(51) Int. Cl.
*H04W 72/00* (2009.01)
*H04W 48/18* (2009.01)
*H04W 76/06* (2009.01)
*H04W 88/02* (2009.01)

(52) U.S. Cl.
CPC ............ *H04W 72/005* (2013.01); *H04W 48/18* (2013.01); *H04W 76/06* (2013.01); *H04W 88/02* (2013.01)

(58) Field of Classification Search
CPC .................................................. H04W 72/005
USPC ............... 370/312, 329, 335; 455/418, 452.1, 455/522, 550
See application file for complete search history.

(56) References Cited

U.S. PATENT DOCUMENTS

| | | | |
|---|---|---|---|
| 7,177,658 B2* | 2/2007 | Willenegger et al. | 455/522 |
| 7,349,703 B2* | 3/2008 | Yi et al. | 455/452.2 |
| 7,436,811 B2* | 10/2008 | Putcha et al. | 370/343 |
| 7,437,178 B2* | 10/2008 | Jeong et al. | 455/525 |
| 7,499,455 B2* | 3/2009 | Lee et al. | 370/395.5 |
| 7,535,882 B2* | 5/2009 | Kim | 370/338 |
| 7,596,380 B2* | 9/2009 | Kim | 455/452.1 |
| 7,620,061 B2* | 11/2009 | Yi et al. | 370/432 |
| 7,636,332 B2* | 12/2009 | Kwak et al. | 370/329 |
| 2004/0116125 A1* | 6/2004 | Terry | 455/450 |
| 2004/0229629 A1* | 11/2004 | Yi et al. | 455/452.2 |
| 2005/0083884 A1* | 4/2005 | Lee et al. | 370/331 |

(Continued)

OTHER PUBLICATIONS

R2-062667 "Enhancing MBMS Support for Mobile TV," 3GPP TSG-RAN WG2 Meeting #54, Tallinn, Estonia, Aug. 28,-Sep. 1, 2006.

(Continued)

*Primary Examiner* — Andrew Lai
*Assistant Examiner* — Andrew C Lee
(74) *Attorney, Agent, or Firm* — Blue Capital Law Firm, P.C.

(57) ABSTRACT

In order to prevent a preferred frequency providing Multimedia Broadcast Multicast Service, called MBMS hereinafter, services, from getting congestion, the present invention provides a method of selecting an operating frequency for a user equipment, called UE hereinafter, in a wireless communications system. The method includes switching the operating frequency from a first frequency to a second frequency when the UE activates to receive a MBMS service of a service group; and switching the operating frequency from the second frequency to the first frequency when the UE determines not to receive any MBMS services provided on the second frequency.

20 Claims, 4 Drawing Sheets

(56) References Cited

U.S. PATENT DOCUMENTS

| | | | |
|---|---|---|---|
| 2005/0152392 A1* | 7/2005 | Lim et al. | 370/432 |
| 2005/0286483 A1* | 12/2005 | Lee et al. | 370/345 |
| 2006/0023664 A1* | 2/2006 | Jeong et al. | 370/329 |
| 2006/0056347 A1* | 3/2006 | Kwak et al. | 370/329 |
| 2006/0056396 A1* | 3/2006 | Chao et al. | 370/352 |
| 2006/0058047 A1* | 3/2006 | Jeong et al. | 455/464 |
| 2006/0072516 A1* | 4/2006 | Jeong et al. | 370/335 |
| 2006/0182058 A1* | 8/2006 | Jeong et al. | 370/329 |
| 2006/0252430 A1* | 11/2006 | Barreto et al. | 455/450 |
| 2007/0030830 A1* | 2/2007 | Sagne et al. | 370/336 |
| 2007/0183458 A1* | 8/2007 | Bouazizi et al. | 370/498 |
| 2007/0191019 A1* | 8/2007 | Fischer et al. | 455/452.2 |
| 2007/0266122 A1* | 11/2007 | Einarsson et al. | 709/220 |
| 2008/0070620 A1* | 3/2008 | van Rooyen | 455/552.1 |
| 2009/0207774 A1* | 8/2009 | Lee et al. | 370/312 |
| 2009/0264133 A1* | 10/2009 | Lee et al. | 455/436 |
| 2010/0165901 A1* | 7/2010 | Kim | 370/312 |
| 2010/0248753 A1* | 9/2010 | Kwak et al. | 455/458 |

OTHER PUBLICATIONS

R2-062408 "Requirements and Design of Mobile TV, Enhancement," 3GPP TSG-RAN WG2 Meeting #54, Tallinn, Estonia, Aug. 28,-Sep. 1, 2006.

3GPP TS 25.331 V7.1.0 (Jun. 2006), Radio Resource Control (RRC); Protocol Specification (Release 7).

* cited by examiner

METHOD OF SELECTING OPERATING FREQUENCY FOR USER EQUIPMENT IN A WIRELESS COMMUNICATIONS SYSTEM AND RELATED APPARATUS

CROSS REFERENCE TO RELATED APPLICATIONS

This application claims the benefit of U.S. Provisional Application No. 60/844,387, filed on Sep. 14, 2006 and entitled "Method And Apparatus for Stopping Reception of the Mobile TV Services in a Wireless Communications System", the contents of which are incorporated herein by reference.

BACKGROUND OF THE INVENTION

1. Field of the Invention

The present invention relates to a method of selecting an operating frequency in a wireless communications system and related communications device, and more particularly to a method of selecting an operating frequency related to multimedia broadcast multicast service, called MBMS, services for a UE in a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. To enhance multimedia functions in the 3G mobile telecommunications system, a protocol specification developed by the 3rd Generation Partnership Project (3GPP) provides Multimedia Broadcast Multicast Service (MBMS). MBMS is a point-to-multipoint bearer service and is established on an existing network architecture of the Universal Mobile Telecommunications System (UMTS), utilizing Internet Protocol (IP) packets as a medium. Thus, MBMS allows a single source entity to transmit data to multiple user equipments (UEs) simultaneously.

According to the protocol specification developed by the 3GPP, MBMS offers two delivery modes: MBMS Broadcast delivery mode and MBMS Multicast delivery mode. When interested in a specific MBMS service, the UE needs to order the MBMS service from a Broadcast Multicast Service Center (BM-SC) by establishing a service agreement including specific service provision phases. These two delivery modes have different service provision phases. The service provision phase of MBMS Broadcast delivery mode includes Service announcement, Session Start, MBMS notification, Data Transfer and Session Stop. The service provision phase of MBMS Multicast delivery mode includes Subscription, Service announcement, Joining, Session Start, MBMS notification, Data Transfer, Session Stop and Leaving. For realizing customized services, Joining and Leaving sessions utilized in MBMS Multicast delivery mode enable the BM-SC to execute authorization and payment recording for the UEs at the Joining session. The service provision phases mentioned above are well known in the art, and will not be described in detail.

From the standpoint of the radio resource control (RRC), all logical data communication exchange channels, be they for providing data transmission exchange to the UE or for providing RRC layer control signal transmission exchange, are defined in the context of a Radio Bearer (RB). In the UE end, the RB comprises one unidirectional, or a pair of, uplink/downlink logic data transmission exchange channels. In the network end, the RB comprises one unidirectional, or a pair of, uplink/downlink logic data transmission exchange channels. For example, a UMTS Terrestrial Radio Access Network (UTRAN) transmits MBMS configuration to the UE by establishing RBs and the UE stops receiving MBMS service by releasing the RBs. According to the RRC protocol specification provide by the 3GPP, an RRC state of the UE can be a disconnection mode or an RRC connection mode. The disconnection mode includes Idle mode, and the RRC connection mode includes CELL_PCH (Cell Paging Channel), URA_PCH (UTRAN Registration Area Paging Channel), CELL_FACH (Cell Forward Access Channel) and CELL_DCH (Cell Dedicated Channel) states.

The MBMS services include two types: Broadcast and Multicast types. Generally, the Broadcast type services are free so that the UE does not need to perform the Joining session before receiving them. For Broadcast type services, the UTRAN always adopts the broadcast transmission mode using point-to-multipoint (p-t-m) RBs to transmit service data and configuration. On the other hand, for the Multicast type services, the UTRAN determines whether to utilize the broadcast or multicast transmission mode based on the service charge policy. In the multicast transmission mode, the UE needs to perform the Joining session, whereas in the broadcast transmission mode, the UE does not need to. In addition, the UTRAN performs a counting procedure to obtain the number of the UEs interested in receiving MBMS services and thereby determines to use point-to-point (p-t-p) or p-t-m RBs. In the following, a transmission via the p-t-p RBs is regarded as a p-t-p transfer mode, and a transmission via the p-t-m RBs is regarded as a p-t-m transfer mode.

The UTRAN generally includes two or more carrier frequencies for providing a variety of services for UEs, and the UEs are appropriately distributed on these carrier frequencies. The UTRAN may provide MBMS services only on one of the carrier frequencies to avoid same MBMS data stream being transmitted on the different frequency layers. Furthermore, the UTRAN may transmit an MBMS MODIFIED SERVICES INFORMATION message to notify the UE of transition to a cell of the preferred frequency layer for the concerned MBMS services. After the frequency transition, the UE will store the previous frequency which the UE operates at.

At the Session Stop of an MBMS service, the UTRAN transmits an MBMS required UE action Information Element (IE) included in the MBMS MODIFIED SERVICES INFORMATION message to the UE in Idle mode, CELL_PCH state, URA PCH state or CELL_FACH state under the p-t-m transfer mode. By setting the MBMS required UE action IE to 'Release PTM RB', the UTRAN can notify the UE of the Session Stop, and thereby the UE releases corresponding p-t-m RBs to stop receiving the MBMS service. In addition, if the MBMS MODIFIED SERVICES INFORMATION message also includes an MBMS dispersion indicator IE, the UE will return to the cell of the stored previous frequency if the UE does not decide to receive another MBMS services on the current frequency. Thus, a notification of the Session Stop transmitted by the UTRAN can direct the UE to transit out of the preferred frequency layer.

Additionally, the UTRAN periodically transmits an MBMS GENERAL INFORMATION message to notify the UE of the current use condition of the preferred frequency layer. For example, if the MBMS GENERAL INFORMATION message includes an MBMS PL (Preferred Layer) Service Restriction Information IE, the UTRAN will not provide any non-MBMS Services (e.g. a mobile-terminated call service). This also indicates that the preferred frequency layer is congested. On the contrary, if the MBMS GENERAL INFORMATION message does not include the MBMS PL Service Restriction Information IE, there are still free radio resources available on the preferred frequency layer where the UTRAN can also provide the non-MBMS Services.

To enhance the MBMS for mobile TV delivery, the 3GPP introduces a concept of MBMS Selected Services, which are a subset of MBMS activated services of the Broadcast type, for which the UE applies RRC procedures to inform the UTRAN which MBMS services have been selected by upper layers in the UE. An MBMS_ACTIVATED_SERVICES variable, related to the MBMS activated services, stores information about the MBMS Multicast services the UE has joined, as well as the MBMS Broadcast services the UE is interested in receiving. The stored information may include Activated service list, Service type, etc. According to the prior art, the MBMS Selected Services, especially the Mobile TV services, are assumed to be available all the time. Hence, there will be no Session Stop notification from the UTRAN and the reception of the MBMS Selected Services will be stopped by the UE. Moreover, according to the RRC specification of 3GPP, if the reception of any MBMS services is stopped by the UE in the p-t-m transfer mode, the UE in Idle mode, CELL_PCH state, URA PCH state or CELL_FACH state only releases related p-t-m RBs without considering returning to the previous frequency layer which the UE operates at. As a result, all the UEs receiving the MBMS Selected Services will stay on the preferred frequency layer after stopping the service reception.

Besides the UEs receiving the MBMS Selected Services, the new UEs, which are not on the preferred frequency layer and decide to receive the MBMS services, will enter the preferred frequency layer. Therefore, the preferred frequency layer is liable to get congested due to increase of the UE number. If the preferred frequency layer is congested, the UE staying on this layer will not be able to receive any new non-MBMS services, such as the mobile-terminated call service.

SUMMARY OF THE INVENTION

Therefore, the present invention provides a method of selecting an operating frequency for a UE in a wireless communications system and related communications device that can prevent a frequency layer, which provides MBMS services, from getting congested.

The present invention discloses a method of selecting an operating frequency for a UE in a wireless communications system. The method includes switching the operating frequency from a first frequency to a second frequency when activating to receive an MBMS service of a service group and switching the operating frequency from the second frequency to the first frequency when determining not to receive any MBMS services provided on the second frequency.

The present invention discloses a communications device of a wireless communications system utilized for accurately selecting an operating frequency to prevent a frequency used for provision of MBMS services from getting congested. The communications device includes a control circuit, a central processing unit and a memory. The control circuit is used for realizing functions of the communications device. The central processing unit is installed in the control circuit and used for executing a program code to operate the control circuit. The memory is coupled to the central processing unit and used for storing the program code. The program code includes switching the operating frequency from a first frequency to a second frequency when activating to receive an MBMS service of a service group and switching the operating frequency from the second frequency to the first frequency when determining not to receive any MBMS services provided on the second frequency.

The present invention further discloses a method of selecting an operating frequency for a UE in a wireless communications system. The method includes switching the operating frequency from a first frequency to a second frequency when activating to receive an MBMS service of a service group and switching the operating frequency from the second frequency to the first frequency when any MBMS services provided on the second frequency are determined not to be received and a service state corresponding to the second frequency is determined to be congested.

The present invention further discloses a communications device of a wireless communications system utilized for accurately selecting an operating frequency to prevent a frequency used for provision of MBMS services from getting congested or to prevent from missing opportunities of receiving non-MBMS services. The communications device includes a control circuit, a central processing unit and a memory. The control circuit is used for realizing functions of the communications device. The central processing unit is installed in the control circuit and used for executing a program code to operate the control circuit. The memory is coupled to the central processing unit and used for storing the program code. The program code includes switching the operating frequency from a first frequency to a second frequency when activating to receive an MBMS service of a service group and switching the operating frequency from the second frequency to the first frequency when any MBMS services provided on the second frequency are determined not to be received and a service state corresponding to the second frequency is determined to be congested.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
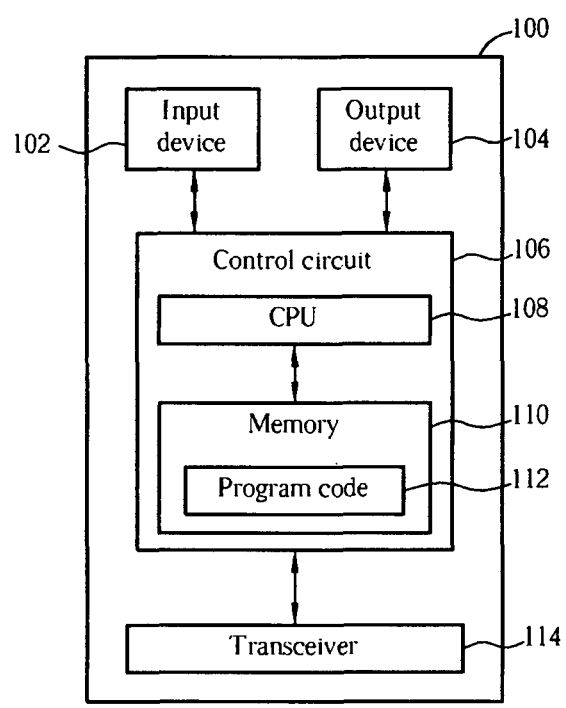
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100.

In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
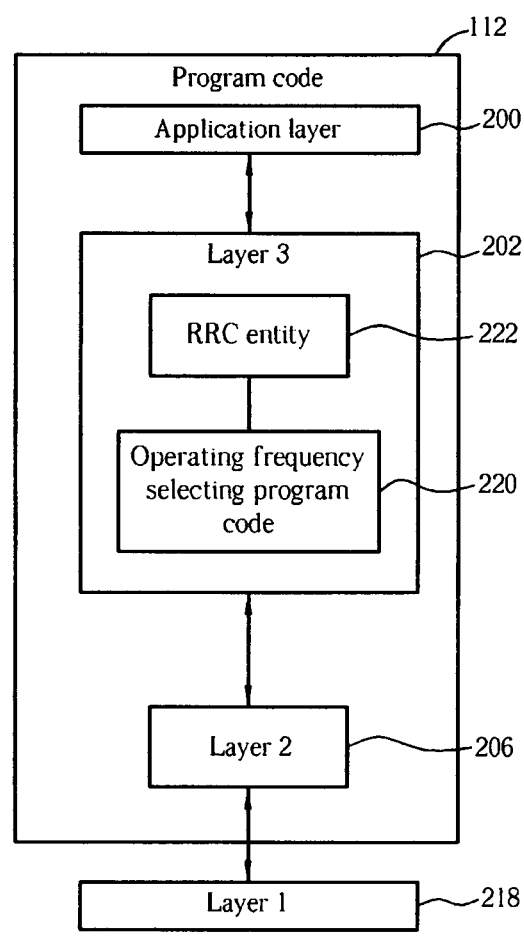
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices, such as a base station or a Node-B. In addition, the RRC entity 222 can change an RRC state of the communications device 100, switching between an Idle mode, CELL_PCH, URA_PCH, CELL_FACH or CELL_DCH state.

Figure 3:
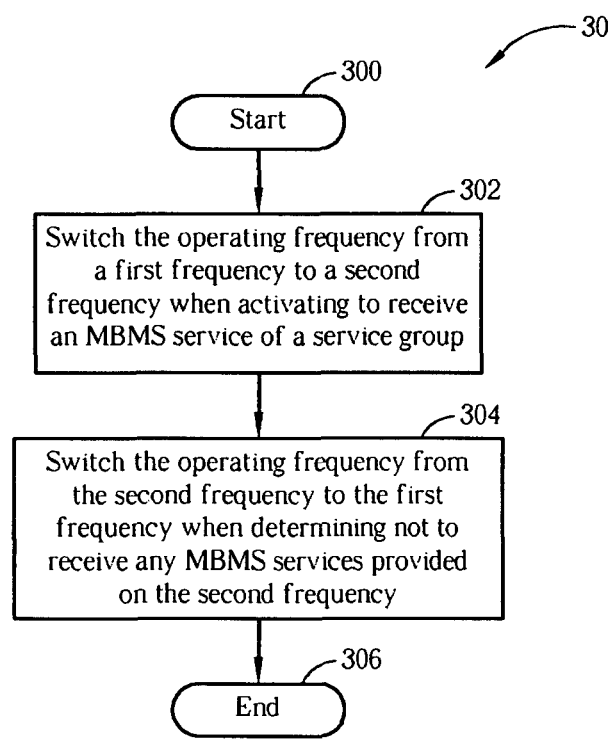
FIG. 3 is a flowchart diagram of a process according to an embodiment of the present invention.

The UTRAN can generate RRC messages and IEs to include MBMS configuration and then transmit them with p-t-m RBs to the communications device 100. In Idle mode, CELL_PCH state, URA PCH state or CELL_FACH state, the RRC entity 222 release the p-t-m RBs to stop receiving an MBMS service as the application layer 200 deactivates the MBMS service. In this situation, the embodiment of the present invention provides an operating frequency selecting program code 220 to improve utilization condition of a preferred frequency layer where MBMS services is provided. Please refer to FIG. 3, which illustrates a schematic diagram of a process 30 according to an embodiment of the present invention. The process 30 is utilized for selecting an operating frequency for a UE in a wireless communications system, and can be compiled into the operating frequency selecting program code 220. The process 30 includes the following steps:

Step 300: Start.

Step 302: Switch the operating frequency from a first frequency to a second frequency when activating to receive an MBMS service of a service group.

Step 304: Switch the operating frequency from the second frequency to the first frequency when determining not to receive any MBMS services provided on the second frequency.

Step 306: End.

According to the process 30, the embodiment of the present invention uses the second frequency to provide the service group for the UE. The second frequency is regarded as the preferred frequency layer. The UE operates at the first frequency before activating to receive the MBMS service. The service group includes at least one MBMS service and each MBMS service is Broadcast type or Multicast type. Preferably, the MBMS service belongs to the above-mentioned MBMS Selected Services, such as the Mobile TV service. In the process 30, the UE may simultaneously receive more than one MBMS service of the service group.

As the MBMS service is activated, the UE switches the operating frequency from the first frequency to the second frequency and stores the first frequency. When the MBMS service is stopped by the UE, the UE releases corresponding p-t-m RBs. Furthermore, the UE switches the operating frequency from the second frequency to the first frequency when determining not to receive any MBMS services on the second frequency. As a result, the UE will not use the radio resources related to the second frequency any more, and the radio resources can be allocated for other UEs. Therefore, the process 30 can properly control the UE number of the second frequency to prevent the second frequency from getting congested.

Figure 4:
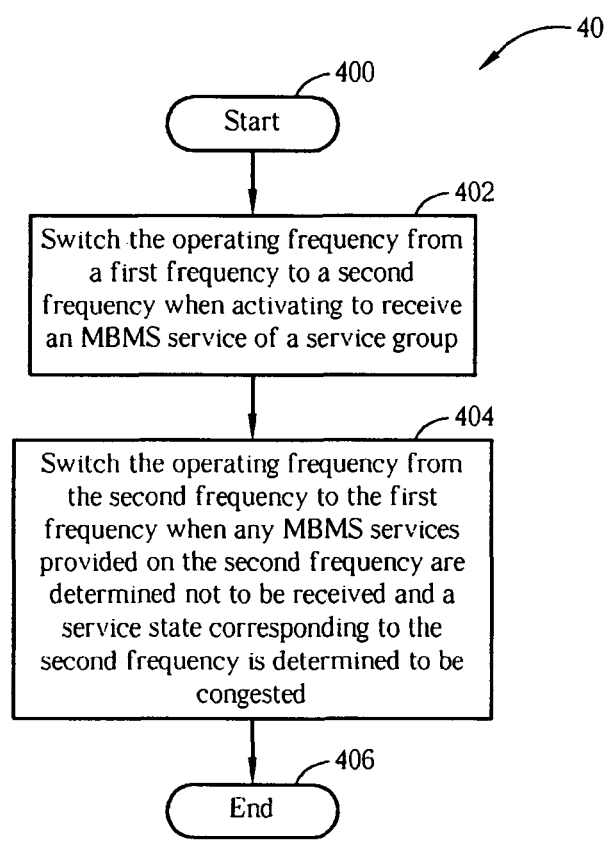
FIG. 4 is a flowchart diagram of a process according to an embodiment of the present invention.

Please refer to FIG. 4, which illustrates a schematic diagram of a process 40 according to an embodiment of the present invention. The process 40 is utilized for selecting an operating frequency for a UE in a wireless communications system, and can be compiled into the operating frequency selecting program code 220. The process 40 includes the following steps:

Step 400: Start.

Step 402: Switch the operating frequency from a first frequency to a second frequency when activating to receive an MBMS service of a service group.

Step 404: Switch the operating frequency from the second frequency to the first frequency when any MBMS services provided on the second frequency are determined not to be received and a service state corresponding to the second frequency is determined to be congested.

Step 406: End.

According to the process 40, the embodiment of the present invention uses the second frequency to provide the service group for the UE. The second frequency is regarded as the preferred frequency layer. The UE operates at the first frequency before activating to receive the MBMS service. The service group includes at least one MBMS service and each MBMS service is Broadcast type or Multicast type. Preferably, the MBMS service belongs to the above-mentioned MBMS Selected Services, such as the Mobile TV service. In the process 40, the UE may simultaneously receive more than one MBMS service of the service group. During operating at the second frequency, the UE periodically receives an MBMS GENERAL INFORMATION message to know the current utilization condition of the second frequency. If the MBMS GENERAL INFORMATION message includes an MBMS PL Service Restriction Information IE, the UE determines that the service state corresponding to the second frequency is congested. Meanwhile, no new non-MBMS services will be provided on the second frequency. On the contrary, if the MBMS PL Service Restriction Information IE is not included, the new non-MBMS services, such as the mobile-terminated call service, can be provided for the UE on the second frequency.

According the above, the UE switches the operating frequency from the first frequency to the second frequency as the MBMS service is activated and further stores the first frequency. When the MBMS service is stopped by the UE, the UE releases corresponding p-t-m RBs. Furthermore, the UE switches the operating frequency from the second frequency to the first frequency when the UE determines not to receive any MBMS services on the second frequency and also determines that the service state corresponding to the second frequency is congested. Thus, the process 40 can mitigate radio resource utilization of the second frequency. Moreover, in the congested state of the second frequency, the process 40 can move the UE out of the second frequency to prevent the UE from missing opportunities to receive non-MBMS services.

In conclusion, according to the prior art, the UE in Idle mode, CELL_PCH state, URA_PCH state or CELL_FACH state only releases p-t-m RBs each time when the reception of the MBMS services is stopped by the UE. In this situation, no frequency transition is considered. Compared to the prior art, the embodiments of the present invention provide two alternatives. One is that the UE moves out of the preferred frequency layer when determining not to receive any MBMS services on the preferred frequency layer. The other is that the UE moves out of the preferred frequency layer when the UE determines not to receive any MBMS services on the preferred frequency layer and also determines that the service state of the preferred frequency layer is congested. Therefore, the embodiment of the present invention can prevent the preferred frequency layer from getting congested or prevent the UE from missing opportunities to receive non-MBMS services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of selecting an operating frequency for a user equipment, called UE hereinafter, in a wireless communications system, the method comprising:
   switching the operating frequency from a first frequency to a second frequency when activating to receive an multimedia broadcast multicast service, called MBMS hereinafter, service of a service group;
   deactivating, by the UE, the MBMS service before a session stop of the MBMS service is issued by a network; and
   switching the operating frequency from the second frequency to the first frequency upon the UE's deactivation of the MBMS service if determining not to receive any MBMS services provided on the second frequency,
   wherein the switching of the operating frequency from the second frequency to the first frequency occurs before the session stop of the MBMS service is issued by the network.

2. The method of claim 1 further comprising releasing a plurality of point-to-multipoint radio bearers corresponding to the MBMS service when stopping receiving the MBMS service.

3. The method of claim 1, wherein the MBMS service is a service of Broadcast type.

4. The method of claim 1, wherein the MBMS service belongs to MBMS Selected Services.

5. The method of claim 1, wherein the MBMS service is a service of Multicast type.

6. The method of claim 1, wherein the UE operates in an Idle mode.

7. The method of claim 1, wherein the UE operates in a CELL_PCH (Cell Paging Channel) state.

8. The method of claim 1, wherein the UE operates in a URA_PCH (Universal Mobile Telecommunications System Terrestrial Radio Access Network Registration Area Paging Channel) state.

9. The method of claim 1, wherein the UE operates in a CELL FACH (Cell Forward Access Channel) state.

10. The method of claim 1, wherein the wireless communications system is a third generation communications system.

11. A communications device of a wireless communications system utilized for accurately selecting an operating frequency to prevent a frequency used for provision of multimedia broadcast multicast service, called MBMS hereinafter, services from getting congested, the communications device comprising:
    a control circuit for realizing functions of the communications device;
    a central processing unit installed in the control circuit for executing a program code to operate the control circuit; and
    a memory coupled to the central processing unit for storing the program code;
    wherein the program code comprises:
        switching the operating frequency from a first frequency to a second frequency when activating to receive an MBMS service of a service group;
        deactivating, by the UE, the MBMS service before a session stop of the MBMS service is issued by a network; and
        switching the operating frequency from the second frequency to the first frequency upon the UE's deactivation of the MBMS service if determining not to receive any MBMS services provided on the second frequency,
        wherein the switching of the operating frequency from the second frequency to the first frequency occurs before the session stop of the MBMS service is issued by the network.

12. The communications device of claim 11, wherein the program code further comprises releasing a plurality of point-to-multipoint radio bearers corresponding to the MBMS service when stopping receiving the MBMS service.

13. The communications device of claim 11, wherein the MBMS service is a service of Broadcast type.

14. The communications device of claim 11, wherein the MBMS service belongs to MBMS Selected Services.

15. The communications device of claim 11, wherein the MBMS service is a service of Multicast type.

16. The communications device of claim 11, wherein the communications device operates in an Idle mode.

17. The communications device of claim 11, wherein the communications device operates in a CELL_PCH (Cell Paging Channel) state.

18. The communications device of claim 11, wherein the communications device operates in a URA_PCH (Universal Mobile Telecommunications System Terrestrial Radio Access Network Registration Area Paging Channel state.

19. The communications device of claim 1, wherein the communications device operates in a CELL_FACH (Cell Forward Access Channel) state.

20. The communications device of claim 11, wherein the wireless communications system is a third generation communications system.

* * * * *